United States Patent
Pfeffer

[15] 3,660,752
[45] May 2, 1972

[54] PHOTOELECTRIC VOLTAGE REGULATOR ARRANGEMENT

[72] Inventor: Peter Pfeffer, Lauffen, Germany
[73] Assignee: Robert Bosch GmbH, Stuttgart, Germany
[22] Filed: Mar. 13, 1970
[21] Appl. No.: 19,280

[30] Foreign Application Priority Data

Mar. 19, 1969 Germany ............. P 19 13 809.1

[52] U.S. Cl. ................. 322/26, 318/313, 322/28, 322/91, 322/93, 323/21
[51] Int. Cl. .................................................. H02p 9/00
[58] Field of Search ............ 322/26, 28, 91, 93; 318/313; 323/21

[56] References Cited

UNITED STATES PATENTS

| | | | |
|---|---|---|---|
| 1,896,547 | 2/1933 | Leece et al. | 322/26 |
| 3,059,169 | 10/1962 | Raver et al. | 322/95 |
| 3,260,917 | 7/1966 | Shimwell et al. | 322/91 UX |
| 3,456,182 | 7/1969 | Cummins et al. | 322/91 X |
| 3,475,677 | 10/1969 | Swinehart et al. | 323/21 |
| 3,476,993 | 11/1969 | Aldrich et al. | 317/235 UX |

*Primary Examiner*—Lewis H. Myers
*Assistant Examiner*—H. Huberfeld
*Attorney*—Michael S. Striker

[57] ABSTRACT

A permanent magnet alternating current generator has an incandescent bulb connected across the full-wave rectifier which furnishes a D.C. current to a load. The incandescent bulb varies the resistance of the photo resistor. A sufficient change in the resistance of the photo resistor causes the conduction of a transistor which in turn causes conduction of a triac which is connected in parallel with one of the two series connected output windings of the generator. When the triac becomes conductive, it short circuits the winding, lowering the output voltage, thus in turn causing the incandescent lamp to emit less light, varying the photo resistance to block the transistor and open the triac.

8 Claims, 1 Drawing Figure

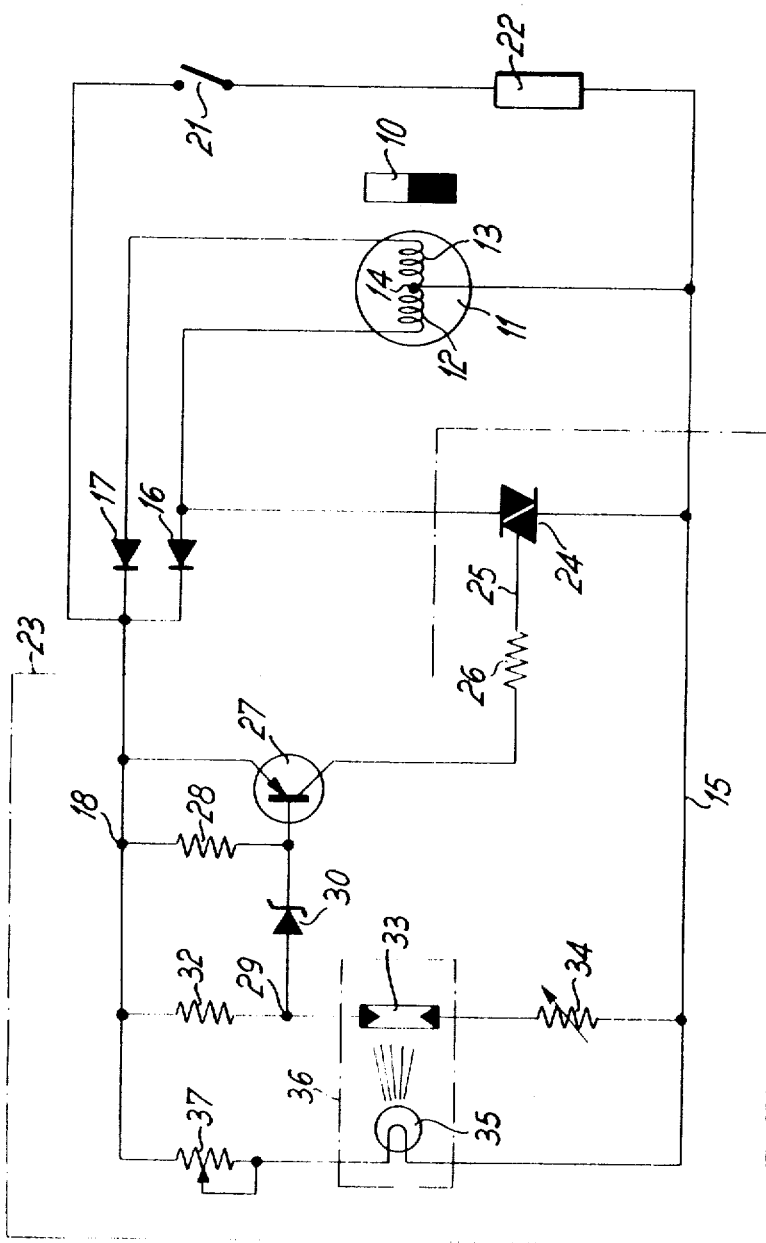

PHOTOELECTRIC VOLTAGE REGULATOR ARRANGEMENT

BACKGROUND OF THE INVENTION

This invention relates to a voltage regulator arrangement for an alternating current generator. In particular, it relates to alternating current generators energized by means of a permanent magnet and adapted to furnish a direct current to a load after rectification of the alternating current.

Alternating current generators energized by permanent magnets are generally used for equipment requiring relatively low power, as, for example, wood saws, motorcycles, motor scooters, snow scooters, and small motor vehicles. Use of a battery for furnishing a direct current is often undesirable in such circumstances, that is, the voltage regulator should be adapted for use without such a battery. Further, the regulation must be sufficiently good, that the lamps connected to the generator do not receive an excessively high voltage and have an adequate operating life.

SUMMARY OF THE INVENTION

The object of this invention is to furnish a voltage regulator arrangement for an alternating current generator used as mentioned above.

This invention is thus a voltage regulator arrangement for an alternating current generator having an output winding. It comprises rectifier means connected to said output winding for furnishing a direct current voltage to a direct current load at a first and second rectifier output terminal. It further comprises controllable impedance means connected in parallel with at least a part of said output winding, the impedance of said controllable impedance means varying in dependence upon a control signal. The invention finally comprises photoelectric means connected to said first and second rectifier output terminal for furnishing said control signal. Such photoelectric means tend to simulate closely the actual conditions at the load, namely, for example, the light being emitted by the headlight of the motor vehicle. Thus, a very good regulation can be obtained even without a battery.

In a preferred embodiment of the present invention, the photoelectric means comprise an incandescent bulb connected to the rectifier output terminals and a photoelectric receiving means connected into the control circuit for the controllable impedance means. Such an incandescent lamp measures the rms value of voltage which is the determining factor in determining the length of the operating life of such lamps. The rms value is, for example, also important relative to the operation of bimetal relays, as for example controlling the directional lights in an automobile.

In practice, it has been shown to be advantageous to limit the heating of the incandescent bulb only to red heat. This increases both the operating life and the vibrational strength. The red heat can be so weak, that it is barely perceptible to the naked eye. At such a temperature, the incandescent coil is not subject to evaporation, thus preventing the glass bulb of the incandescent lamp from becoming blackened. This in turn allows the regulated voltage to be substantially constant during the total operating life of the lamp.

The photoelectric receiving means may be embodied in a photo resistance, that is a resistance whose value depends upon the amount of radiation received.

In a particularly preferred embodiment of the present invention, the photo resistance is a part of a voltage divider which is connected in parallel to the D.C. network. This voltage divider becomes part of the control circuit of a semi-conductor switch. This voltage divider, thus, on the one hand, measures the absolute value of the voltage across the D.C. network and, on the other hand, has a voltage divider ratio which is also dependent upon the effective, or rms value of this voltage. While the measurement by means of the incandescent lamp causes a definite, although small, time delay, the use of the voltage divider involves substantially zero time delay.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic diagram of a voltage regulator in accordance with the present invention.

DESCRIPTION OF THE PREFERRED EMBODIMENTS

A preferred embodiment of the present invention will be described with reference to the drawing.

The drawing shows a permanent magnet 10 used for the excitation of a single phase generator 11 having two series connected output windings 12 and 13 with a common point 14. The common point 14 is connected to the negative supply line 15 of a D.C. network, while the two end points of the winding are connected over diodes 16 and 17, respectively, to the positive supply line 18 of the D.C. network. It should be noted that of course a polyphase generator could, of course, be used instead of the single-phase generator used here for illustrative purposes. Windings 12 and 13 are mutually coupled by means of the iron of generator 11, as is the case in almost all electrical machines. Thus, for this subject, reference may be made to any of the known text books, and no further discussion will be forthcoming herein.

Switch 21 permits various loads to be connected to the D.C. network. Such loads may, for example, be headlights, ignition circuits or, possibly, a battery. However, it is a particular advantage of the arrangement in accordance with this invention, that it can be operated without a battery.

A triac 24, one embodiment of controllable impedance means, is connected in parallel to the output winding 12. A triac is a type of bidirectional thyristor as is well known in the art. Thus the controllable impedance is a zero impedance or a substantial short circuit when the triac is conducting, or, a substantial open circuit or infinite impedance, when the triac is non-conducting. When the triac is conducting, the winding 12 is short circuited and, due to the magnetic coupling between the windings, the winding 13 is also substantially short circuited, thus causing the output voltage of generator 11 to be reduced to a very low value.

The voltage regulator 23, which includes triac 24, functions to short circuit winding 12, as set forth above, when the voltage across lines 15 and 18 reaches an excessively high value. The control electrode of triac 24 is connected to the collector of a pnp transistor 27 whose emitter is connected to the positive supply line 18, while the base is connected to the cathode of a Zener diode 30 and, via a resistance 28, to the positive supply line 18. The anode of Zener diode 30 is connected to a point 29, which is the common point of a photo resistance 33 and a first resistor, resistor 32. The other terminal of resistor 32 is connected to the positive supply line, while the terminal of photo resistance 33, which is away from point 29, is connected to the negative supply line 15 by means of a second resistor, resistance 34. This resistance may be a variable resistance. Thus, resistors 32, 33 and 34 constitute a voltage divider which is connected across the D.C. network. The voltage divider tap has a voltage divider 29. It is seen that this voltage divider is part of a control circuit for triac 24.

Photo resistance 33, whose resistance decreases when receiving radiation in a conventional manner, forms part of photoelectric means. The photoelectric means are connected in a light-proof housing 36 which also contains an incandescent lamp 35 (e.g. 6 volts, 0.6 watts). This housing is arranged directly on a printed circuit card as are the other circuit elements of voltage regulator arrangement 23. Incandescent lamp 35 may, for example, be directly connected with the photo resistance by means of a welded or pasted glass fiber light conductive bundle in order to utilize the output of the lamp to maximum advantage. The distance between the photo resistance 33 and the incandescent lamp is precisely determined.

Electrically, the lamp is directly connected to the negative supply line 15 and it is further connected to the positive supply line 18 by means of an adjusting resistance 37. Resistance 37 serves to determine the desired voltage. This is done by adjusting the resistance in such a manner that the current through the incandescent lamp 35 causes this lamp to be heated to a red heat when the D.C. voltage is at the nominal value (e.g. 12 volts).

In practice, it has been proven advantageous to adjust the red heat in such a manner that it is barely discernable in a dark room. This, as stated above, causes a particularly high vibratory strength and operating life, thus, in turn, causing the output voltage to remain constant over the maximum possible time period.

The following values have been proven to result in an operation for a 12-volt generator.

Zener diode 30 .... Zener voltage 8 volts, type BZY 85
Resistor 32 .... 6.8 kOhm
Photo resistance 33 ... ORP 61
Resistor 34 .... 2.5 kOhm The above-described arrangement operates as follows:

When the equipment is first put into operation, the output voltage of generator 11 is lower than the desired operating voltage. Thus lamp 35 does not radiate any visible radiation and photo resistance 33 has a high value. Zener diode 30 is subjected only to a small voltage and is therefore non-conducting. Correspondingly, transistor 27 is blocked and triac 24 has no current flow at its control electrode 25. Thus triac 24 is also blocked.

If, at higher speeds, or for a low load, the voltage at lines 15 and 18 increases above a predetermined value, then the incandescent lamp 35 emits more radiation causing resistance 33 to have a decreasing resistance value caused by the reception of radiant energy. Simultaneously, the voltage across voltage divider 32, 33, and 34 increases causing Zener diode 30 to become conductive. Base current thus flows in transistor 27 causing this transistor to become conductive. Conduction of the emitter-collector circuit of transistor 27 in turn causes control electrode 25 of triac 24 to receive current and winding 12 is short circuited by triac 24. This causes the output voltage to decrease, causing lamp 35 to become darker and, by a process analogous described above, triac 24 becomes blocked when the voltage across it reaches an instantaneous zero value and the above-described circuit operation repeats.

Of course, other photoelectric means, or perhaps more correctly optoelectronic means, may be substituted for the incandescent lamp and the photo resistance. For example, dry photovoltaic cells could be used. However, the particular arrangement described above has the advantage that, in the present state of the art, particularly inexpensive components may be used.

While the invention has been illustrated and described with variable impedance means embodied in a triac, it is not intended to be limited to the details shown, since various modification and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Voltage regulator arrangement for an alternating current generator having an output winding, comprising, in combination, rectifier means connected to said output winding for furnishing a direct current voltage to a direct current load at a first and second output terminal; bidirectional thyristor switching means directly connected in parallel with part of said output winding, said bidirectional thyristor switching means having a gate and changing substantially from infinite impedance to substantially zero impedance upon receipt of a control signal at said gate; and control signal furnishing means for furnishing said control signal when the amplitude of said direct current voltage exceeds a predetermined amplitude, said control signal furnishing means comprising voltage divider means having a photoresistance and having a voltage divider tap, connected from said first to said second output terminal; illuminating means connected in parallel with said voltage divider means, mounted in operative proximity to said photoresistance means, the light emitted by said illuminating means varying as a function of said direct current voltage; transistor means having an emitter-collector circuit and a base; means connecting said emitter-collector circuit from said first output terminal to said gate of said bidirectional thyristor switching means; and Zener diode means connecting said base of said transistor means to said voltage divider tap.

2. An arrangement as set forth in claim 1, wherein said illuminating means comprise an incandescent bulb.

3. A voltage regulator arrangement as set forth in claim 2, wherein said incandescent bulb is heated to a red heat only.

4. A voltage regulator arrangement as set forth in claim 3, wherein said red heat is a low red heat, barely perceptible by the human eye.

5. A voltage regulator arrangement as set forth in claim 1, wherein said bidirectional thyristor switching means comprise a triac.

6. A voltage regulator arrangement as set forth in claim 5, wherein said output winding comprises a first winding; and a second winding series connected with and magnetically coupled to said first winding; and wherein said triac is connected in parallel with said first winding.

7. A voltage regulator arrangement as set forth in claim 6, wherein said rectifier means comprise a full-wave rectifier.

8. A voltage regulator arrangement as set forth in claim 1, wherein said alternating current generator comprises a permanent magnet.

* * * * *